United States Patent Office

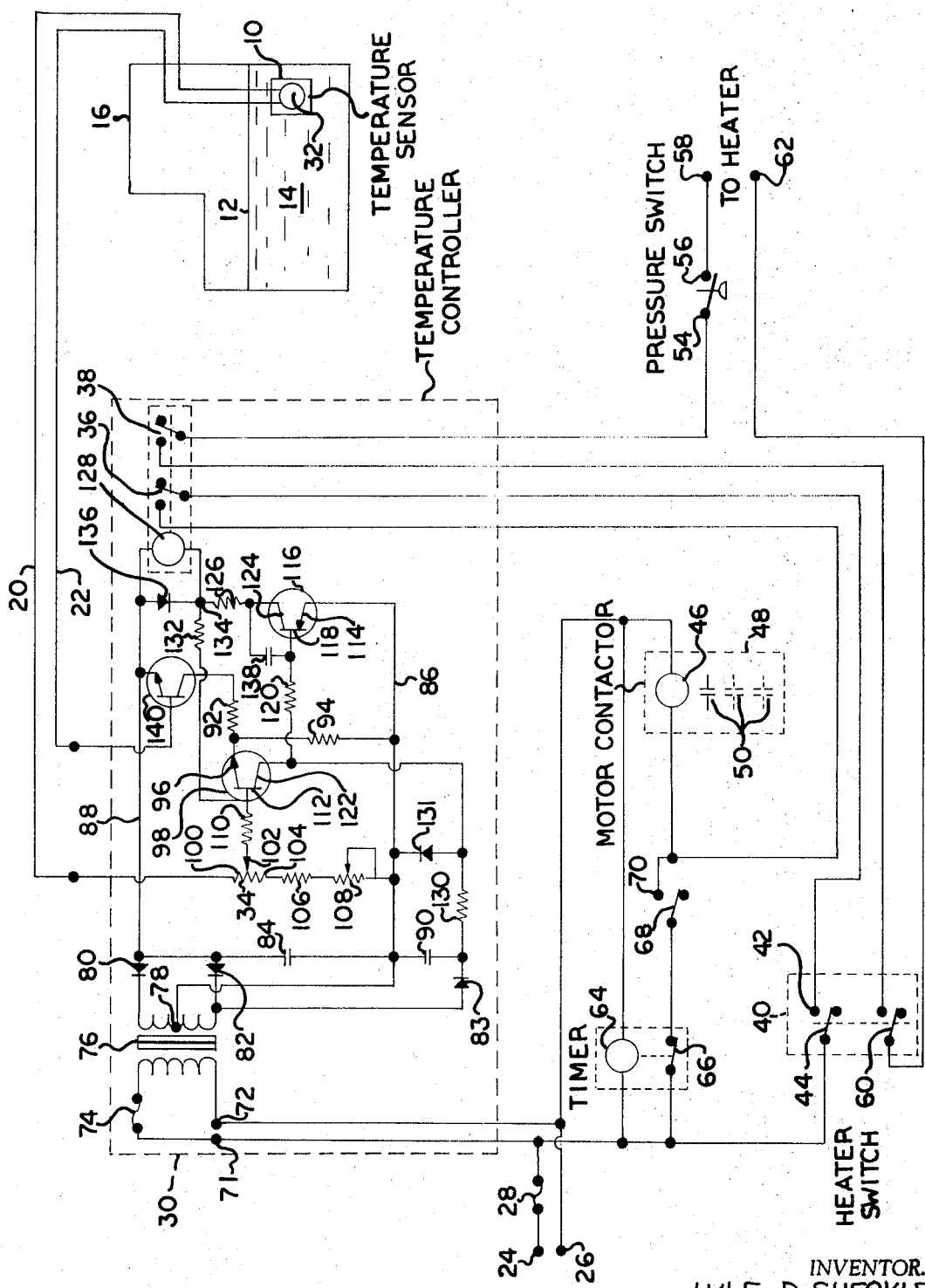

3,528,548
Patented Sept. 15, 1970

3,528,548
ELECTRICAL CIRCUIT FOR TEMPERATURE CONTROL OF SWIMMING POOL WATER
Lyle D. Sheckler, Toledo, Ohio, assignor to K & L Electronics, Inc., Toledo, Ohio, a corporation of Ohio
Filed Apr. 26, 1967, Ser. No. 633,902
Int. Cl. E04h 3/20
U.S. Cl. 210—103                                          1 Claim

ABSTRACT OF THE DISCLOSURE

An electrical circuit which provides a sequence of operation initially sensing swimming pool water temperature below a predetermined minimum to energize an associated filtration pump; sensing the force of the water being pumped through the filter to assure safe and non-damaging operation of an associated water heater; energizing the heating action of the water heater; de-energizing the water heater if there is insufficient water flowing through the filter to assure safe and non-damaging operation of the water heater; and finally, de-energizing the water heater and the filtration pump when the water in the swimming pool has reached the desired temperature.

BACKGROUND OF THE INVENTION

Field of the invention

Automatic temperature regulating circuitry energizing an electric motor whose operation is controlled by means of a relay which is in turn controlled by means responsive to the temperature to be controlled.

Description of the prior art

The typical swimming pool heater systems contain a thermostat which senses the temperature of the water entering therein. The action of the thermostat determines whether the heating element of the heater is on or off. To have a swimming pool heater with a thermostat as described above function properly, it is necessary to circulate water past the thermostat continuously.

Due to heat transfer occurring in the associated piping between the swimming pool and the typically remote water heater location, the temperature of the water circulating past the thermostat may not necessarily be the same as the temperature in the pool.

To keep the swimming pool clean, the filtration pump must be run approximately eight hours a day. A timing device is included in these systems to control the time when the filtration pump is on for filtration purposes.

It will be appreciated that in the prior art systems, the requirement for continuous circulation of the swimming pool water to be heated is costly. By disposing the water temperature sensing device of the system in the swimming pool proper and utilizing the other features of the invention, necessary circulation of the swimming pool water through the heater is found to be reduced and thereby minimizes the cost of operation.

SUMMARY

It is an object of the invention to provide a precise temperature control for water in an associated swimming pool.

Another object of the invention is to make possible the use of a domestic water heater or boiler as an automatic swimming pool heater.

The above and other objects of the invention may be achieved in a system for controlling the temperature of a swimming pool including a heater, a filtration unit, a conduit for water, an entry port for said conduit in said pool, an exit port for said conduit in said pool, said conduit extending between said entry and exit ports and to said heater and filtration unit, a pump in communication with said conduit for circulating water therethrough, means for driving said pump, a pressure sensitive switch in communication with said conduit and responsive to a given range of water pressure indicative of water circulation through said conduit: the improvement comprising a water temperature sensor; a water temperature controller responsive to a predetermined range of temperatures imposed upon said sensor; first and second electrical switches closed by said controller when responsive to said ranges of temperatures; means for energizing said pump driving means including said first switch and a source of power; means for energizing said filter; and a second circuit including said second switch and said pressure sensitive switch for actuating said means for energizing said heater while said temperature is within said predetermined range and said water pressure is within said given range.

BRIEF DESCRIPTION OF THE DRAWING

The above objects and advantages of the invention will be clearly understood from reading the following detailed description of an embodiment of the invention when considered in the light of the accompanying drawing which is a schematic circuit diagram of a system embodying the features of the invention.

DESCRIPTION OF THE PREFERRED EMBODIMENT

Referring to the figure a temperature sensing device 10 is typically located beneath the surface 12 of the water 14 in a swimming pool. For purposes of protection from damage by occupants of the swimming pool and for ease of servicing, the sensing device may be located in a skimmer box diagrammatically illustrated by reference numeral 16. The sensing device 10 is connected to a remotely situated temperature controller 30 by means of conductors 20 and 22 which could be cabled, if desired.

AC power is applied to the associated temperature controller 30 through terminals 24 and 26. It will be noted that the conductor coupled to the terminal 24 is properly fused by a fuse element 28. When the temperature of the water 14 of the swimming pool decreases, the resistance of a thermistor 32 disposed within the sensing device 10 increases. Typically, the thermistor 32 is potted in a polyester resin to render the same waterproof and resistant to mechanical shock. The resistance of the thermistor 32 at which the temperature controller 30 responds and consequently the temperature of water 14 in which the sensing device 10 is immersed can be changed merely by changing the setting of a variable resistor 34, the operation of which will become obvious from the following description. The ultimate response of the temperature controller 30 to a temperature which is lower than the temperature at which the temperature controller is set is effected by the closing of two normally open relay contacts or switches 36 and 38 which are located within the temperature controller.

The relay contacts 36 are an integral part of a first circuit; while the relay contacts 38 are an integral part of a second circuit. There is an associated manually controlled heater switch 40 disposed exteriorly of the temperature controller 30 which when in the position whereim the switch element 44 is in contact with the terminal 42 AC power is applied through the switch to a temperature controller contact 36 to the coil 46 of a motor contactor 48 which will actuate the closing of the normally open motor contactor contact or contacts 50. AC power will be applied through the motor contactor contacts 50 to an associated motor (not shown) causing the same to rotate and drive a filtration pump (not shown). The filtration pump is effective to pull water from the swimming pool and force the same through an associated filter device (not shown). Some of the water leaving the filter would be diverted through a water heater (not shown) and thereafter would be mixed with the balance of the water leaving the water heater. The water then flows to the associated pool. A pressure switch 54 senses the pressure of the water flowing through the filtration pump to the filter and when the pump is not operating, contacts 56 of a pressure switch 54 are maintained in an open position. When the pump is operating and adequate water is flowing through the filter, the pressure at the pressure switch 54 is sufficient to close the contact 56. When the pump is operating and adequate water is not flowing through the filter, possibly due to the filter being clogged, the contacts 56 of the pressure switch 54 are opened due to the excess pressure. The pressure switch 54 is of a special design wherein the contacts 56 are designed to be closed only within a predetermined range of pressure and will be opened when the pressure falls outside of or below the range.

With the heater switch 40 in an on position and with the normally open contacts 38 of the temperature controller closed, and with the contact 56 of the pressure switch closed, the second circuit will be completed from a terminal 58 through the contact 56 of the pressure switch 54, through the contacts 38 of the temperature controller 30, through contact 60 of the heater switch 40, to a terminal 62. The terminals 58 and 62 are connected into the associated water heater or boiler control circuit in the same manner as the terminals of a domestic heating thermostat are connected into the furnace control circuit and completion of the circuit through the terminals 58 and 62 initiates the firing or energization of the water heater or boiler in the same manner as completion of the circuit through a thermostat initiates the firing of a furnace.

As the water 14 in the associated swimming pool is heated and the temperature thereof rises, such rise is sensed by the sensing device 10 and the resistance of the thermistor 32 decreases to a value which causes the temperature controller 30 to be energized and therefore react. The reaction of the temperature controller 30 causes the contacts 36 and 38 of the temperature controller 30 to open. The opening of the contact 38 interrupts the circuit between the terminals 58 and 62 initiating the de-energization of the heating element of the associated water heater in the same manner as the opening of the contacts of a domestic heating thermostat initiates the de-energization of the flame of a convention domestic furnace. The opening of the contact 36 interrupts the circuit through the motor contact coil 46 and the motor contactor conacts 50 open to remove power from the associated pump motor. The pump motor thereby stops rotating and driving the associated pump and the flow of water through the system ceases.

The AC power applied to the terminals 24 and 26 through the fuse 28 energizes a timing device 64 which in turn operates in a manner such that its contact 66 closes and opens at predetermined time intervals. Typically, the cycle of the timing device 64 is two hours "on" and six hours "off." During the portion of the year when the swimming pool is being used, the switch 68 is normally closed, except for periods of repair to the associated pumping mechanism. At the beginning of the "on" cycle, the contact 66 closes and thereby permits current to flow to the motor contactor 46 energizing the associated filtration pump. The opening of the contacts 66 will interrupt the circuit through the motor contactor coil 46 and the associated pump will stop at the end of the "on" cycle.

The temperature controller network 30 is energized by applying AC power to the terminals 71 and 72 through a fuse 74 to the primary side of a transformer 76. The secondary side of the transformer 76 supplies a voltage of approximately 13.4 volts on either side of a center tap 78.

The secondary voltage is utilized to provide a negative voltage supply through the full wave of rectifying action of a pair of diodes 80 and 82, and a positive voltage supply is provided through the half wave of rectifying action of a diode 83. A capacitor 84 connected between the diodes 80 and 82 and a zero voltage line 86 is charged to a voltage of approximately 19 volts, the minus line 88 being negative with respect to the zero line 86. A capacitor 90 is connected between the diode 83 and the zero line 86 and is charged to a voltage of approximately 19 volts, the junction of the diode 83 and the capacitor 90 being positive with respect to the zero line 86.

A pair of resistors 92 and 94 form a voltage divider network which biases the emitter of a transistor 98 at a voltage of approximately 9.5 volts.

The thermistor 32, the upper portion 100 of the temperature setting variable resistor 34 above the wiper element 102, the lower portion 104 of the temperature setting resistor 34 below the wiper element 102, a resistor 106 and a calibrating variable resistor 108 from another voltage divider network. The voltage between the wiper 102 of the temperature setting variable resistor 34 and the minus line 88 is a function of the resistance of the thermistor 32. Since the resistance of the thermistor 32 is a function of the temperature of the water in the associated pool, it will follow that the voltage between the wiper 102 and the temperature setting variable resistor 34 and the minus line 88 is a function of the temperature of the water 14 in the pool. When the temperature of the water 14 is the same as the temperature at which the temperature controller 30 is set, the voltages of the wiper 102 and the emitter of the transistor 98 are of the same value.

When the temperature of the water 14 is less than the temperature at which the temperature controller 30 is set, the voltage between the wiper 102 and the minus line 88 is greater than the voltage between the emitter 96 of the transistor 98 and the minus line 88, causing a current flow through the resistor 110 from the base 112 of the transistor 98 to the emitter 96 causing the same to conduct. With the transistor 98 conducting, the current will flow from the emitter 114 of a transistor 116 to the base 118 thereof, through a resistor 120, from the collector 122 to the emitter 96 of the transistor 98. The current flowing from the emitter 114 to the base 118 of the transistor 116 causes the transistor 116 to conduct. Current flows from the emitter 114 to the collector 124 of the transistor 116, through a resistor 126 and a relay coil 128. The current flowing through the relay coil 128 causes the relay to actuate, closing its associated contacts 36 and 38.

When the temperature of the water 14 is greater than the temperature at which the temperature controller 30 is set, the voltage between the wiper 102 and the minus line 88 is smaller than the voltage between the emitter 96 of the transistor 98 and the minus line. The transistor 98 is biased to cut off and does not conduct. The current flowing through the resistor 130 is greater than any leakage current flowing through the transistor 98. The difference between the current flowing through the resistor 130 and the leakage current through the transistor 98 is conducted through a diode 131 to the zero line 86. This maintains the transistor 116 biased to a non-conducting state.

A resistor 132 is used to provide a differential between the temperature at which the controller 30 calls for heat, to close the contacts 36 and 38; and when the controller 30 calls for no heat, to open the contacts 36 and 38.

When the temperature of the controller 30 is not calling for heat, the potential at the point 134 will be essentially the same as the potential of the minus line 88 allowing current to flow through the resistor 110 through the resistor 132 and the relay coil 128 to the minus line 88. The resultant voltage drop through the resistor 110 biases the base 112 of the resistor 98 slightly negative with respect to the wiper 102. Before the transistor 98 can conduct, the voltage between the wiper 102 and the minus line 88 must exceed the sum of the voltage between the emitter 96 of the transistor 98 and the minus line 88, the emitter-base junction of the transistor 98 voltage drop and the voltage drop through the resistor 110 resulting from the current flowing through the resistor 110 and the resistor 132.

When the temperature controller 30 is calling for heat, the transistor 116 will be conducting and the voltage between the point 134 and the minus line 88 is approximately 12 volts. Current will flow through the resistor 132 through the base 112 to the emitter 96 of the transistor 98. Before the transistor 98 can be biased to cut off, the voltage between the wiper 102 and the minus line 88 must be such that the current flowing through the resistor 110 to the wiper 102 is equal to the current flowing from the point 134 through the resistor 132.

A diode 136 is used to provide a path for the current in the relay coil 128 while the magnetic field thereof is decaying.

For a brief period just prior to when the controller 30 switches from one state to the other, the transistor 116 is neither saturated nor cut off and an alternating component of current flows through the resistor 120. To prevent this alternating components of the current from causing relay contacts 36 and 38 to chatter, a capacitor 138 is employed. The capacitor 138 slows down the response of the transistor 116 so that relay contacts 36 and 38 will not chatter.

Normally, current will flow through the thermistor 32 of sufficient magnitude to saturate a transistor 140 having the base thereof coupled to the conductor 22. The saturation of the transistor 140 completes a circuit from the conductor 86 through the voltage divider network 94 and 92 causing the transistor 98 to be biased so that it can conduct when the resistance of the thermistor 32 calls for heat. Assuming that the thermistor 32 or the associated electrical conductors were open by damage or the like causing the system to see a very high resistance, as would be the case where the temperature of the water was low, the transistor 140 will not conduct and therefore renders the system inoperative and will not permit heater operation. The transistor 140 acts as a thermistor break protector.

The following table lists the values of the circuit parameters used in a preferred embodiment:

| | |
|---|---|
| 32 | 2030 ohms at 52° F., 570 ohms at 100° F. |
| 34 | 200 ohms. |
| 76 | 26.8 volts center tapped secondary. |
| 80 | IN2069. |
| 82 | IN2069. |
| 83 | IN2069. |
| 84 | 500 mfd. |
| 90 | 250 mfd. |
| 92 | 100 ohm. |
| 94 | 100 ohm. |
| 98 | 2N3053. |
| 106 | 470 ohm. |
| 108 | 1.5 K. |
| 110 | 2.2 K. |
| 116 | 2N1544. |
| 120 | 2.2 K. |
| 126 | 68 ohm. |
| 128 | 120 ohm relay coil. |
| 130 | 39 K. |
| 131 | IN2069. |
| 132 | 150 K. |
| 136 | IN2069. |
| 138 | .25 mfd. |
| 140 | 2N3053. |

It will be appreciated that the range of temperatures within which the system will become energized depends upon the value of the resistor 132; while the temperature level of the system is determined by the variable resistor 34.

Also, it will be apparent to one skilled in the art that the electrical circuitry illustrated and described hereinabove is readily adaptable for the energization of a conventional domestic type water heater.

What I claim is:

1. In a system for controlling the temperature of a swimming pool including a heater, a filtration unit, a conduit for water, an entry port for said conduit in said pool, an exit port for said conduit in said pool, said conduit extending between said entry and exit ports and to said heater and filtration unit, a pump in communication with said conduit for circulating water therethrough, means for driving said pump, a pressure sensitive switch in communication with said conduit and responsive to a given range of water pressure indicative of water circulation through said conduit, the improvement comprising: a water temperature sensor disposed to sense the water temperature of the swimming pool; a water temperature controller comprising a solid-state switching circuit coupled to said first and second electrical switches for selective energization thereof disposed remote from said swimming pool responsive to a predetermined range of temperatures imposed upon said sensor; first and second electrical switches closed by said controller when responsive to said ranges of temperatures; a first circuit means for energizing said pump driving means including said first switch and a source of power; means for energizing said heater; and a second circuit means including said second switch and said pressure sensitive switch for actuating said means for energizing said heater while said temperature is within said predetermined range and said water pressure is within said given range.

References Cited

UNITED STATES PATENTS

| | | | |
|---|---|---|---|
| 2,315,184 | 3/1943 | Boosey | 210—169 |
| 2,348,670 | 5/1944 | Woodward | 210—149 X |
| 2,731,529 | 1/1956 | Leins | 219—328 |
| 2,761,052 | 8/1956 | Knudsen | 219—328 X |
| 3,062,999 | 11/1962 | Brown | 219—331 |
| 3,351,739 | 11/1967 | Eckman | 219—331 |
| 2,499,494 | 3/1950 | Greer | 210—62 |
| 3,139,069 | 6/1964 | Van Den Broek et al. | 210—169 |

REUBEN FRIEDMAN, Primary Examiner

T. A. GRANGER, Assistant Examiner

U.S. Cl. X.R.

210—169

PO-1050
(5/69)

UNITED STATES PATENT OFFICE
CERTIFICATE OF CORRECTION

Patent No. 3,528,548      Dated September 15, 1970

Inventor(s) Lyle D. Sheckler

It is certified that error appears in the above-identified patent and that said Letters Patent are hereby corrected as shown below:

Column 3, line 50, change "convention" to --conventional--; line 52, change "contact" to --contactor--.

Column 4, line 20, change "from" to --form--; line 72, change "resistor" to --transistor--.

Column 5, line 23, change "components" to --component--.

SIGNED AND SEALED
JAN 1 8 1971

(SEAL)
Attest:

Edward M. Fletcher, Jr.
Attesting Officer

WILLIAM E. SCHUYLER, JR.
Commissioner of Patents